US006051525A

United States Patent [19]
Lo et al.

[11] Patent Number: 6,051,525
[45] Date of Patent: *Apr. 18, 2000

[54] CATALYST FOR THE MANUFACTURE OF POLYETHYLENE WITH A BROAD OR BIMODAL MOLECULAR WEIGHT DISTRIBUTION

[75] Inventors: Frederick Yip-Kwai Lo, Piscataway; Robert I. Mink, Warren; Thomas Edward Nowlin, Cranbury; Sandra Denise Schregenberger, Neshanic; Pradeep Pandurang Shirodkar, Belle Mead, all of N.J.

[73] Assignee: Mobil Corporation, Fairfax, Va.

[*] Notice: This patent issued on a continued prosecution application filed under 37 CFR 1.53(d), and is subject to the twenty year patent term provisions of 35 U.S.C. 154(a)(2).

[21] Appl. No.: 08/892,591

[22] Filed: Jul. 14, 1997

[51] Int. Cl.⁷ .................................................... C08F 4/64
[52] U.S. Cl. ........................ 502/113; 526/114; 526/160; 526/943; 526/127
[58] Field of Search ............................ 502/113; 526/160, 526/943, 127, 114

[56] References Cited

U.S. PATENT DOCUMENTS

| | | | |
|---|---|---|---|
| 2,924,593 | 2/1960 | Breslow et al. | 260/94.9 |
| 3,242,099 | 3/1966 | Manvik et al. | 252/429 |
| 3,950,269 | 4/1976 | Setterquist | 252/430 |
| 4,188,470 | 2/1980 | Collina et al. | 526/64 |
| 4,299,936 | 11/1981 | Candlin et al. | 526/119 |
| 4,310,648 | 1/1982 | Shipley et al. | 526/114 |
| 4,324,691 | 4/1982 | Hartshorn et al. | 252/429 B |
| 4,329,252 | 5/1982 | Gavens et al. | 252/429 B |
| 4,338,424 | 7/1982 | Morita et al. | 526/65 |
| 4,356,111 | 10/1982 | Shipley et al. | 252/429 B |
| 4,399,053 | 8/1983 | Shipley et al. | 252/429 B |
| 4,402,861 | 9/1983 | Hoff | 252/429 B |
| 4,404,344 | 9/1983 | Sinn et al. | 526/160 |
| 4,414,369 | 11/1983 | Kuruda et al. | 526/65 |
| 4,420,592 | 12/1983 | Kato et al. | 526/65 |
| 4,446,288 | 5/1984 | Hoff | 526/129 |
| 4,518,751 | 5/1985 | Mizogami et al. | 526/114 |
| 4,525,550 | 6/1985 | Warzelhan et al. | 526/116 |
| 4,530,914 | 7/1985 | Ewen et al. | 502/113 |
| 4,536,484 | 8/1985 | Lacombe et al. | 502/62 |
| 4,542,199 | 9/1985 | Kaminsky et al. | 526/160 |
| 4,554,265 | 11/1985 | Graves | 502/113 |
| 4,568,659 | 2/1986 | Warzelhan et al. | 502/111 |
| 4,578,373 | 3/1986 | Graves | 502/113 |
| 4,618,660 | 10/1986 | Graves | 526/114 |
| 4,658,078 | 4/1987 | Slaugh et al. | 585/512 |
| 4,659,685 | 4/1987 | Coleman, III | 502/113 |
| 4,665,047 | 5/1987 | Slaugh et al. | 502/108 |
| 4,701,432 | 10/1987 | Welborn, Jr. | 502/113 |
| 4,703,094 | 10/1987 | Raufast | 526/65 |
| 4,707,530 | 11/1987 | Johnson | 526/129 |
| 4,710,552 | 12/1987 | Bachl et al. | 526/116 |
| 4,752,597 | 6/1988 | Turner | 502/104 |
| 4,769,510 | 9/1988 | Kaminsky et al. | 585/512 |
| 4,794,096 | 12/1988 | Ewen | 502/117 |
| 4,808,561 | 2/1989 | Welborn, Jr. | 502/104 |
| 4,814,540 | 3/1989 | Watanabe et al. | 585/523 |
| 4,820,786 | 4/1989 | Bacskai | 526/152 |
| 4,871,704 | 10/1989 | Kohara et al. | 502/114 |
| 4,874,734 | 10/1989 | Kioka et al. | 502/104 |
| 4,897,455 | 1/1990 | Welborn, Jr. | 526/129 |
| 4,910,272 | 3/1990 | Marchand et al. | 526/129 |
| 4,912,075 | 3/1990 | Chang | 502/107 |
| 4,914,253 | 4/1990 | Chang | 585/523 |
| 4,918,038 | 4/1990 | Samuels et al. | 502/112 |
| 4,923,833 | 5/1990 | Kioka et al. | 502/9 |
| 4,925,821 | 5/1990 | Chang | 502/107 |
| 4,931,517 | 6/1990 | Fujita | 526/128 |
| 4,933,403 | 6/1990 | Kaminsky et al. | 526/160 |

(List continued on next page.)

FOREIGN PATENT DOCUMENTS

| | | |
|---|---|---|
| 0 516 458 | 4/1992 | European Pat. Off. . |
| 0 515 132 | 5/1992 | European Pat. Off. . |
| WO 95/13871 | 5/1995 | WIPO . |

OTHER PUBLICATIONS

Kaminsky, Walter; "Living Polymers" On Polymerization with Extremely Productive Ziegler Catalysts, Agnew. Chem. Int. Ed. Engl. 19 (1980).

Kaminsky, Walter; "Influence of Hydrogen on the Polymerization of Ethylene with the Homogeneous Ziegler System Bis(cyclopentadienyl)zirconiumdichloride/aluminoxane" Makromol. Chem. 225–225 (1984).

Kaminsky, Walter; "Isotactic Polymerization of Propene with (n–1,1'–ethylenedi–4,5,,6,7–tetrahydroindenyl)zirconium dichloride Combined with Methylaluminoxane" Malromol. Chem. Rapid Commun. 8, 305–310 (1987).

Kaminsky, Walter; "Bix(cyclopentadienyl)zirkon—Verbindungen and Aluminoxan als Ziegler Katalysatoren fur die Polymersation and Copolymerisation von Olefinen", Malromol. Chem., Rapid Commun., 4, 417–421 (1983).

1980 Dissertation of Andresen with Translation, UV spektoskopische Untersurchungen . . . als Katalysatorkompohente.

1985 Dissertation of Hahnsen with Translation. "Kinetische und mechanistische . . . und Methylaluminoxan".

Herwig Dissertation with Translation Enclosed. "Olefinpolymerisation mit loslichen . . . Aluminiumalkylkomponente".

1985 Dissertation of Kulper with Translation. "Polymerissationsverhalten von loslichen, . . . gegenuber 1–Olefinen".

1981 Diplomarbeit of Kulper with Translation. "Homogene, Chlorhaltige . . . –von(CpMe5)2ZrC12 . . . von Cp2 ZrC12 . . . von Ethen".

*Primary Examiner*—David W. Wu
*Assistant Examiner*—Sing-Siu Choi
*Attorney, Agent, or Firm*—Lori F. Cuomo; Dennis P. Santini

[57] ABSTRACT

A catalyst composition is described for preparing a high activity catalyst in silica which produces, in a single reactor, polyethylene with a broad or bimodal molecular weight distribution. The catalyst is prepared from the interaction of silica, previously calcined at 600° C., with dibutylmagnesium, 1-butanol and titanium tetrachloride and a solution of methylalumoxane and ethylenebis[1-indenyl] zirconium dichloride.

9 Claims, 2 Drawing Sheets

U.S. PATENT DOCUMENTS

| | | | |
|---|---|---|---|
| 4,935,397 | 6/1990 | Chang | 502/117 |
| 4,937,217 | 6/1990 | Chang | 502/111 |
| 4,937,301 | 6/1990 | Chang | 526/128 |
| 4,939,217 | 7/1990 | Stricklen | 526/114 |
| 4,952,540 | 8/1990 | Kioka et al. | 502/9 |
| 4,962,248 | 10/1990 | Winter et al. | 585/12 |
| 4,962,262 | 10/1990 | Winter | 585/512 |
| 4,980,330 | 12/1990 | Marchand et al. | 502/115 |
| 5,001,205 | 3/1991 | Hoel | 526/128 |
| 5,006,500 | 4/1991 | Chang | 502/107 |
| 5,008,228 | 4/1991 | Chang | 502/111 |
| 5,021,595 | 6/1991 | Datta | 556/42 |
| 5,023,388 | 6/1991 | Luker | 585/9 |
| 5,026,797 | 6/1991 | Takahashi | 526/124 |
| 5,032,562 | 7/1991 | Lo et al. | 502/111 |
| 5,043,515 | 8/1991 | Slaugh et al. | 585/512 |
| 5,049,535 | 9/1991 | Resconi et al. | 502/117 |
| 5,055,438 | 10/1991 | Canich | 502/117 |
| 5,057,475 | 10/1991 | Canich et al. | 502/104 |
| 5,066,631 | 11/1991 | Sangokoya et al. | 502/152 |
| 5,077,255 | 12/1991 | Welborn, Jr. | 502/104 |
| 5,082,817 | 1/1992 | Albizzati et al. | 502/102 |
| 5,086,024 | 2/1992 | Crapo et al. | 502/117 |
| 5,086,135 | 2/1992 | Kissin | 526/151 |
| 5,087,788 | 2/1992 | Wu | 585/512 |
| 5,091,352 | 2/1992 | Kioka et al. | 502/103 |
| 5,120,696 | 6/1992 | Tsutsui et al. | 502/113 |
| 5,122,491 | 6/1992 | Kioka et al. | 502/117 |
| 5,126,301 | 6/1992 | Tsutsui et al. | 502/108 |
| 5,126,303 | 6/1992 | Resconi et al. | 502/117 |
| 5,132,262 | 7/1992 | Rieger et al. | 502/117 |
| 5,132,381 | 7/1992 | Winter et al. | 526/160 |
| 5,145,819 | 9/1992 | Winter et al. | 502/117 |
| 5,147,949 | 9/1992 | Chang | 526/129 |
| 5,157,008 | 10/1992 | Sangokoya et al. | 502/111 |
| 5,162,278 | 11/1992 | Razavi | 502/152 |
| 5,171,799 | 12/1992 | Kioka et al. | 26/127 |
| 5,171,871 | 12/1992 | Miyashita | 556/27 |
| 5,171,919 | 12/1992 | Watanabe et al. | 585/523 |
| 5,173,464 | 12/1992 | Pettijohn et al. | 502/104 |
| 5,182,244 | 1/1993 | Pettijohn | 502/110 |
| 5,189,000 | 2/1993 | Masi et al. | 502/113 |
| 5,196,496 | 3/1993 | Galimberti et al. | 526/348.6 |
| 5,198,399 | 3/1993 | Goff et al. | 502/111 |
| 5,206,197 | 4/1993 | Campbell, Jr. | 502/103 |
| 5,206,199 | 4/1993 | Kioka et al. | 502/117 |
| 5,208,304 | 5/1993 | Waymouth | 526/164 |
| 5,216,095 | 6/1993 | Dolle et al. | 526/127 |
| 5,223,465 | 6/1993 | Ueki et al. | 502/117 |
| 5,225,500 | 7/1993 | Elder et al. | 526/127 |
| 5,234,878 | 8/1993 | Tsutsui et al. | 502/103 |
| 5,238,891 | 8/1993 | Miro | 502/104 |
| 5,238,892 | 8/1993 | Chang | 502/111 |
| 5,240,894 | 8/1993 | Burkhardt et al. | 502/108 |
| 5,241,025 | 8/1993 | Hlatky et al. | 526/129 |
| 5,242,876 | 9/1993 | Shamshoum et al. | 502/113 |
| 5,258,342 | 11/1993 | Luciani et al. | 502/107 |
| 5,260,244 | 11/1993 | Pettijohn | 502/115 |
| 5,278,117 | 1/1994 | Luciani et al. | 502/113 |
| 5,281,679 | 1/1994 | Jejelowo et al. | 526/114 |
| 5,304,523 | 4/1994 | Razavi | 502/152 |
| 5,308,816 | 5/1994 | Tsutsui et al. | 502/108 |
| 5,317,036 | 5/1994 | Brady, III et al. | 523/223 |
| 5,324,800 | 6/1994 | Welborn, Jr. et al. | 526/160 |
| 5,329,033 | 7/1994 | Spaleck et al. | 556/53 |
| 5,332,706 | 7/1994 | Nowlin et al. | 502/107 |
| 5,340,786 | 8/1994 | Tsutsui et al. | 502/117 |
| 5,347,025 | 9/1994 | Yamada et al. | 556/11 |
| 5,348,926 | 9/1994 | Yamada et al. | 502/117 |
| 5,350,817 | 9/1994 | Winter et al. | 526/119 |
| 5,359,015 | 10/1994 | Jejelowo | 526/114 |
| 5,372,682 | 12/1994 | Devore et al. | 204/72 |
| 5,373,072 | 12/1994 | Chang | 526/129 |
| 5,374,700 | 12/1994 | Tsutsui et al. | 526/348.3 |
| 5,384,298 | 1/1995 | Inahara et al. | 502/104 |
| 5,385,877 | 1/1995 | Fujita et al. | 502/103 |
| 5,395,810 | 3/1995 | Shamshoum et al. | 502/113 |
| 5,399,636 | 3/1995 | Alt et al. | 526/129 |
| 5,409,874 | 4/1995 | Imuta et al. | 502/103 |
| 5,412,131 | 5/1995 | Sangokoya | 556/175 |
| 5,416,053 | 5/1995 | Bai et al. | 502/128 |
| 5,416,178 | 5/1995 | Winter et al. | 526/160 |
| 5,416,179 | 5/1995 | Welch et al. | 526/160 |
| 5,422,325 | 6/1995 | Jejelowo et al. | 502/104 |
| 5,434,116 | 7/1995 | Sone et al. | 502/103 |
| 5,436,305 | 7/1995 | Alt et al. | 526/160 |
| 5,451,649 | 9/1995 | Zenk et al. | 526/160 |
| 5,453,475 | 9/1995 | Rieger et al. | 526/160 |
| 5,455,316 | 10/1995 | Tsutsui et al. | 526/114 |
| 5,455,365 | 10/1995 | Winter et al. | 556/7 |
| 5,459,217 | 10/1995 | Todo et al. | 526/348.1 |
| 5,466,649 | 11/1995 | Jejelowo | 502/120 |
| 5,473,028 | 12/1995 | Nowlin et al. | 526/114 |
| 5,525,678 | 6/1996 | Mink et al. | 525/246 |
| 5,723,399 | 3/1998 | Takemoto et al. | 502/113 |

CATALYST FOR THE MANUFACTURE OF POLYETHYLENE WITH A BROAD OR BIMODAL MOLECULAR WEIGHT DISTRIBUTION

FIELD OF THE INVENTION

This invention relates to a catalyst for producing broad molecular weight distribution polyolefin product. The catalyst is a supported catalyst which comprises two transition metal components; the two transition metal components each exhibit a different hydrogen reactivity, and therefore, under the same olefin polymerization conditions produce at least two different molecular weight fractions, one of which exhibits a lower molecular weight than the other.

BACKGROUND OF THE INVENTION

Broad molecular weight distribution (MWD) polyolefins may be characterized as containing at least two different molecular weight (MW) polymer fractions. One polymer fraction has a relatively high molecular weight (HMW) relative to the second polymer fraction which has a relatively low molecular weight (LMW). FIG. 2 illustrates a sample of polyethylene product in which the difference in MW of each of the two polymer fractions is relatively large so that each of the two polymer components are clearly identified in the Gel Permeation Chromatogram recorded on such a polymer sample. This type of MWD is required for polyethylene products exhibiting a relatively high density (0.93–0.96 g/cc) and used in manufacturing polyethylene film.

However, a different MWD (illustrated in FIG. 1) is required for polyethylene products exhibiting a lower density range (0.90–0.93 g/cc) in order to reduce the amount of polymer which is extracted with hexane (designated as hexane extractables) which must be less than 6 wt. % so that this type of polyethylene may be used in food packaging applications. For such applications, the relatively LMW polymer component must be somewhat higher in MW so that the hexane extractables test required for food packaging applications may be passed, i.e., less than 6 wt. % of the polymer. In addition, a similar MWD is required for polyethylene products exhibiting a density range of 0.93–0.96 g/cc which may be used in blow molding applications.

SUMMARY OF THE INVENTION

The invention relates to a catalyst which contains two transition metal components on a carrier or support. Each of the two transition metal components differ from each other in hydrogen response so that, under the same olefin polymerization conditions, at least two different molecular weight fractions are produced. One of the transition metal components provides the lower molecular weight fraction and the other transition metal component provides the higher molecular weight fraction.

The invention also relates to polyolefin products produced with these catalysts. The polyolefins can be polypropylene, homopolymers of ethylene and copolymers of ethylene. When used to form LLDPE (linear low density polyethylene) the lower molecular weight component of the broad molecular weight distribution will exhibit reduced extractables, and the film will have improved toughness and processability. High density polyolefin products with densities of greater than 0.94 and above, e.g. 0.95 g/cc and above, can be used to form blow molding products, and are readily processed in blow molding equipment.

DESCRIPTION OF THE DRAWING(S)

FIGS. 1 and 2 are gel permeation chromatograms of polyethylene produced with catalysts No. 1 and 4, respectively.

DETAILED DESCRIPTION OF THE INVENTION

Figure 1:
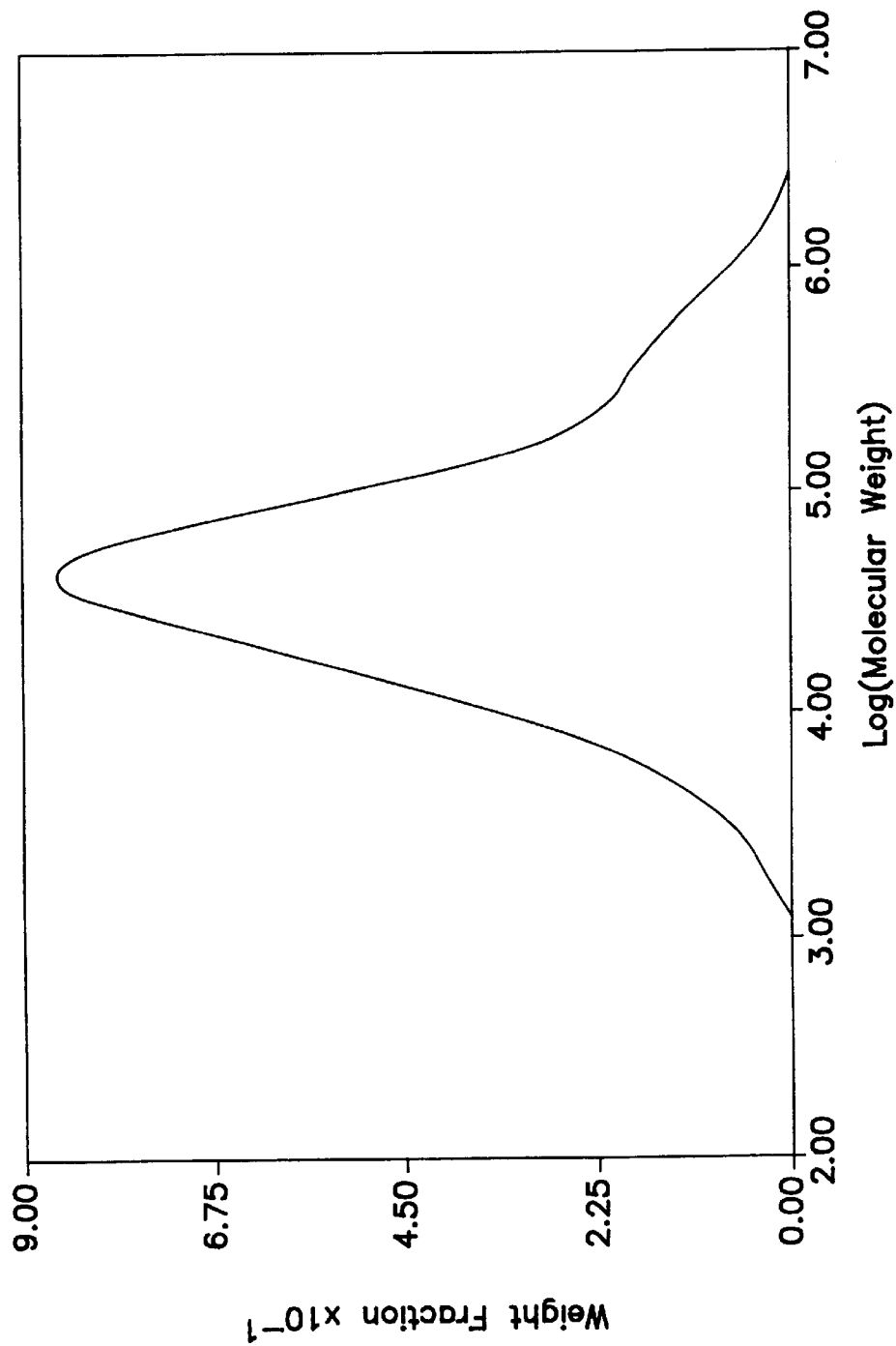
Figure 2:
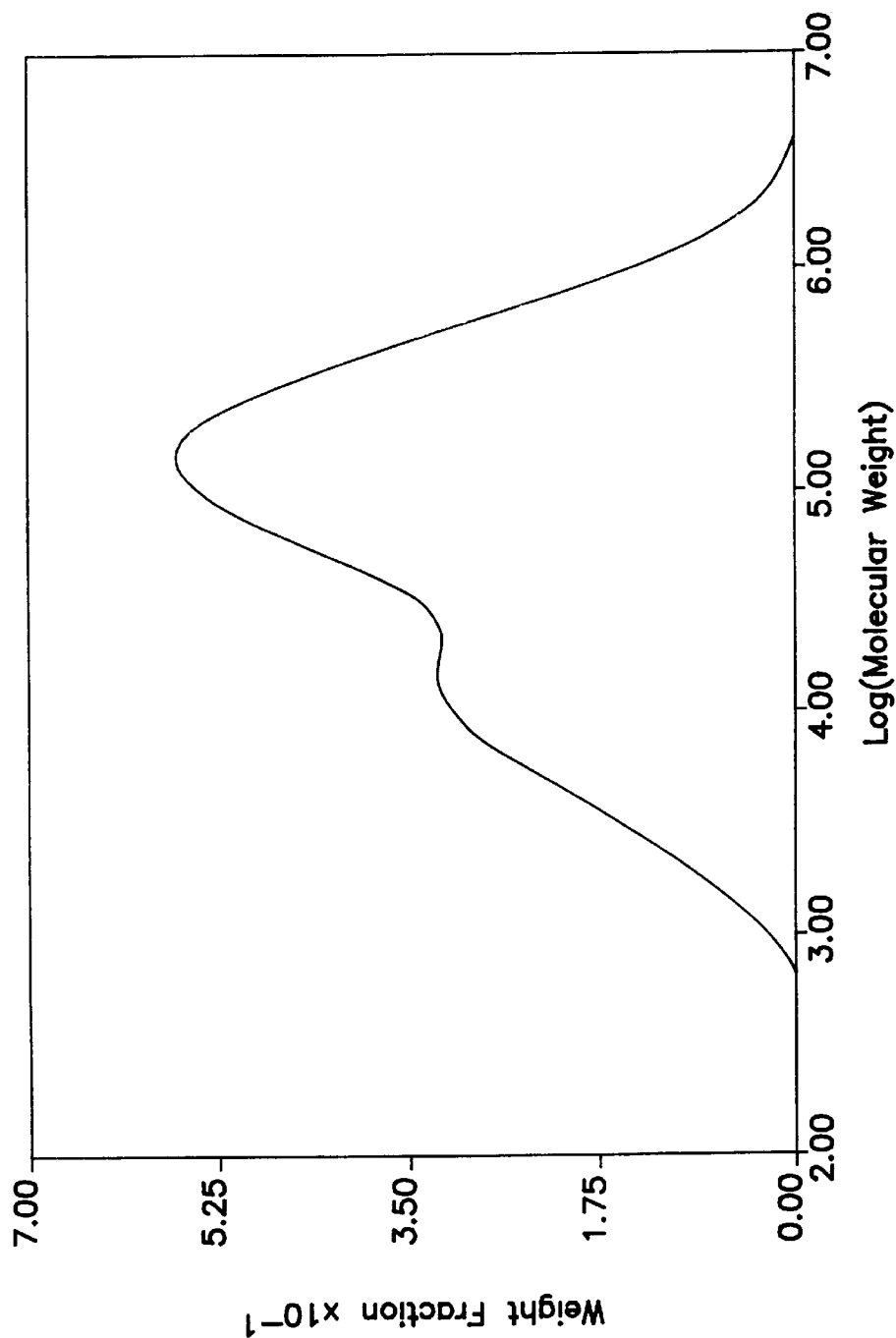

The invention relates to a catalyst and its use in the preparation of bimodal MWD polymers and copolymers of ethylene, preferably broad MWD resins prepared in one polymerization reactor. The catalyst comprises at least two transition metal components on a support; one of the two transition metal components is provided in the form of a metallocene. The aluminum alkyl compound used in the polymerization reactor is a non-oxygen containing aluminum compound. In accordance with the invention, no alumoxane (e.g. methylalumoxane) feed to the reactor (slurry or gas phase fluidized bed) is required for the activation of the transition metal provided as a metallocene.

Catalyst Composition

Catalysts which contain at least two transition metals, one in the form of a metallocene and one transition metal in the form of a non-metallocene, have an activity of at least about 1000 g polymer/g catalyst or about 100 kg polymer/g of each transition metal.

The catalysts of the invention comprise a cocatalyst comprising an aluminum alkyl compound, such as a trialkyl aluminum, free of alumoxane and free of water, or oxygen-containing oligomers and polymers of the aluminum alkyl compound, and a catalyst precursor comprising a carrier, an alumoxane and at least one metallocene compound; in one embodiment, the catalyst further includes a non-metallocene transition metal compound.

The carrier material is a solid, particular, porous, preferably inorganic material, such as an oxide of silicon and/or of aluminum. The carrier material is used in the form of a dry powder having an average particle size of from about 1 micron to about 500 microns, preferably from about 10 microns to about 250 microns. The surface area of the carrier is at least about 3 square meters per gram ($m^2/g$), and preferably at least about 50 $m^2/g$ up to about 350 $m^2/g$. The carrier material should be dry, that is, free of absorbed water. Drying of the carrier material can be effected by heating at about 100° C. to about 1000° C., preferably at about 600° C. When the carrier is silica, it is heated to at least 200° C., preferably about 200° C. to about 850° C., and most preferably at about 600° C. The carrier material must have at least some active hydroxyl (OH) groups to produce the catalyst composition of this invention.

In the most preferred embodiment, the carrier is silica which, prior to the use thereof in the first catalyst synthesis step, has been dehydrated by fluidizing it with nitrogen and heating at about 600° C. for about 4–16 hours to achieve a surface hydroxyl group concentration of about 0.7 millimoles per gram (mmol/g). The silica of the most preferred embodiment is a high surface area, amorphous silica (surface area=300 $m^2/g$; pore volume of about 1.65 $cm^3/g$), and it is a material marketed under the tradenames of Davison 952 by the Davison Chemical Division of W. R. Grace and Company or Crosfield ES70 by Crosfield Limited. The silica is in the form of spherical particles, e.g., as obtained by a spray-drying process. As procured, these silicas are not calcined and must be dehydrated as indicated above.

The catalyst synthesis is undertaken under inert conditions in the absence of water and oxygen. The carrier is dispersed in solvent to form a slurry.

The carrier material is slurried in a non-polar solvent and the resulting slurry is contacted with at least one organometallic compound. Preferably, the organometallic compound is an organomagnesium compound having the empirical formula below. The slurry of the carrier material in the solvent is prepared by introducing the carrier into the solvent, preferably while stirring, and heating the mixture to about 25° C. to about 70° C., preferably to about 40° C. to about 60° C. Temperatures here are critical with respect to the non-metallocene transition metal which is subsequently added. That is, temperatures in this slurry of about 90° C. result in deactivation of the transition metal added subsequently. Accordingly, all catalyst precursor synthesis steps are conducted below 90° C. The slurry is then contacted with the aforementioned organometallic compound, while the heating is continued as indicated.

The preferred organometallic, an organomagnesium compound, has the empirical formula

where R and R' are the same or different $C_2$–$C_{12}$ alkyl groups, preferably $C_4$–$C_{10}$ alkyl groups, more preferably $C_4$–$C_8$ alkyl groups, and most preferably both R and R' are mostly butyl groups, providing that m+n is equal to the valence of Mg. Other organometallic compounds which may be used include di-n-hexylmagnesium, and organomagnesium compounds that contain an aluminum compound which is used to improve the solubility of organomagnesium compounds in hydrocarbon solvents.

Suitable non-polar solvents are materials which are liquid at reaction temperatures and in which all of the reactants used herein, i.e., the organomagnesium compound, and the non-metallocene transition metal compound, are at least partially soluble. Preferred non-polar solvents are alkanes, such as isopentane, isohexane, hexane, n-heptanes, octane, nonane, and decane, although a variety of other materials including cycloalkanes, such as cyclohexane, aromatics, such as benzene, toluene and ethylbenzene, may also be employed. The most preferred non-polar solvent is isopentane. Prior to use, the non-polar solvent should be purified, such as by percolation through silica gel and/or molecular sieves, to remove traces of water, oxygen, polar compounds, and other materials capable of adversely affecting catalyst activity.

In the most preferred embodiment of the synthesis of this catalyst, it is important to add only such an amount of the organometallic, e.g. an organomagnesium compound that will be deposited—physically or chemically—into the support since any excess of the organomagnesium compound in the liquid phase may react with other synthesis chemicals and precipitate outside of the support. The carrier drying temperature affects the number of sites on the carrier available for the organomagnesium compound—the higher the drying temperature the lower the number of sites. Thus, the exact molar ratio of the organomagnesium compound to the hydroxyl groups will vary and must be determined on a case-by-case basis to assure that only so much of the organomagnesium compound is added as will be deposited onto the support without leaving any excess of the organomagnesium compound in the liquid phase. Furthermore, it is believed that the molar amount of the organomagnesium compound deposited into the support is greater than the molar content of the hydroxyl groups on the support. Thus, the molar ratios given below are intended only as an approximate guideline and the exact amount of the organomagnesium compound in this embodiment must be controlled by the functional limitation discussed above, i.e. it must not be greater than that which can be deposited into the support. If greater than that amount is added to the solvent, the excess may react with the non-metallocene transition metal compound, thereby forming a precipitate outside of the support which is detrimental in the synthesis of our catalyst and must be avoided. The amount of the organomagnesium compound which is not greater than that deposited into the support can be determined in any conventional manner, e.g. by adding the organomagnesium compound to the slurry of the carrier in the solvent, while stirring the slurry, until the organomagnesium compound is detected in the liquid phase.

For example, for the silica carrier heated at about 600° C., the amount of the organomagnesium compound added to the slurry is such that the molar ratio of Mg to the hydroxyl groups (OH) on the solid carrier is about 0.5:1 to about 4:1, preferably about 0.8:1 to about 3:1, more preferably about 0.9:1 to about 2:1 and most preferably about 1:1. The organomagnesium compound dissolves in the non-polar solvent to form a solution from which the organomagnesium compound is deposited onto the carrier.

It is also possible to add such an amount of the organomagnesium compound which is in excess of that which will be deposited into the support, and then remove, e.g. by filtration and washing, any excess of the organomagnesium compound. However, this alternative is less desirable than the most preferred embodiment described above.

The organometallic treated support is contacted with an organic alcohol reagent (R"OH) containing R"O-groups which are reactive or capable of displacing alkyl groups on the magnesium atom. The amount of this organic alcohol reagent is effective to provide a R"OH:Mg ratio of 0.5 to 2.0, preferably 0.8 to 1.5.

Contact of the organometallic-silica intermediate, with the organic alcohol reagent, is undertaken in the slurry. Contact is undertaken at a temperature ranging from 25° C. to 80° C., preferably 40° C. to 70° C.

The alkyl group in the organic alcohol reagent can contain 1 to 12 carbon atoms, preferably 1 to 8; in the embodiments below, it is an alkyl group containing 2 to 4 carbon atoms, particularly of 4 carbon atoms (butyl). The inclusion of the alcohol reagent step in the catalyst synthesis of the invention produces a catalyst which, relative to the absence of this step, is much more active, requires much less non-metallocene transition metal (e.g. titanium).

After the addition of the organic alcohol reagent to the slurry is completed, the slurry is contacted with a transition metal compound to provide the first of at least two transition metal components. In preferred embodiments, this transition metal component is a non-metallocene transition metal compound, free of substituted or unsubstituted cyclopentadienyl groups. The slurry temperature must be maintained at about 25° C. to about 70° C., preferably to about 40° C. to about 60° C. As noted above, temperatures in this slurry of about 80° C. or greater result in deactivation of the non-metallocene transition metal. Suitable non-metallocene transition metal compounds used herein are compounds of metals of Groups 4A and 5A of the Periodic Chart of the Elements, as published by Chemical and Engineering News, 63(5), 27, 1985, providing that such compounds are soluble in the non-polar solvents. Non-limiting examples of such compounds are titanium and vanadium halides, e.g. titanium tetrachloride, vanadium tetrachloride, vanadium oxytrichloride, titanium and vanadium alkoxides, wherein the alkoxide moiety has a branched or unbranched alkyl group of 1 to about 20 carbon atoms, preferably 1 to about 6 carbon atoms. The preferred transition metal compounds are titanium compounds, preferably tetravalent titanium compounds. The most preferred titanium compound is titanium tetrachloride. The amount of titanium or vanadium, in non-metallocene form, ranges from a Ti/Mg ratio of 0.10 to 2.0, preferably from 0.3 to 1.0.

Mixtures of such transition metal compounds may also be used and generally no restrictions are imposed on the transition metal compounds which may be included. Any transition metal compound that may be used alone may also be used in conjunction with other transition metal compounds.

After the addition of the non-metallocene transition metal compound is complete, the liquid phase is removed by evaporation or filtering to obtain a free-flowing powder. Next, incorporation of the metallocene can be undertaken. The metallocene is activated with an alumoxane solution.

The metallocene compound is ethylene bis[1-indenyl] zirconium dichloride.

The alumoxane can be impregnated into the carrier at any stage of the process of catalyst preparation. In this embodiment, the amount of Al, provided by alumoxane, is sufficient to provide an Al:transition metal (provided by metallocene) molar ratio ranging from 50 to 500, preferably 75 to 300.

The class of alumoxanes comprises oligomeric linear and/or cyclic alkylalumoxanes represented by the formula: R—(Al(R)—O)$_n$—AlR$_2$ for oligomeric, linear alumoxanes and (—Al(R)—O—)$_m$ for oligomeric cyclic alumoxanes wherein n is 1–40, preferably 10–20, m is 3–40, preferably 3–20, and R is a C$_1$–C$_8$ alkyl group and preferably methyl (MAO). MAO is a mixture of oligomers with a very wide distribution of molecular weights and usually with an average molecular weight of about 1200. MAO is typically kept in solution in toluene.

Incorporation of the activated metallocene into the carrier can be accomplished in various ways. Incorporation of the alumoxane can be into the slurry resulting from the addition, i.e. after the addition, of the non-metallocene transition metal compound.

Alternatively and in accordance with the method of the examples, infusion of alumoxane into the pores of the carrier, the carrier slurry can be stripped of solvent, after the addition of the non-metallocene transition metal compound, to form a free-flowing powder. The free-flowing powder can then be impregnated by determining the pore volume of the carrier and providing an alumoxane (or metallocene-alumoxane) solution in a volume equal to or less than the total pore volume of the carrier, and recovering a dry catalyst precursor. The resulting free-flowing powder, referred to herein as a catalyst precursor, is combined with an activator (sometimes referred to as a cocatalyst).

The volume of the solution comprising a solid alumoxane and a solvent therefor can vary. In the examples of alumoxane incorporation into the carrier, one of the controlling factors in the alumoxane incorporation into the carrier material catalyst synthesis is the pore volume of the silica. In this embodiment, the process of impregnating the carrier materials is by infusion of the alumoxane solution, without forming a slurry of the carrier material, such as silica, in the alumoxane solution. The volume of the solution of the alumoxane is sufficient to fill the pores of the carrier material without forming a slurry in which the volume of the solution exceeds the pore volume of the silica; accordingly and preferably, the maximum volume of the alumoxane solution is, does not exceed, the total pore volume of the carrier material sample. That maximum volume of the alumoxane solution insures that no slurry of silica is formed. Accordingly, if the pore volume of the carrier material is 1.65 cm$^3$/gram of carrier material, then the volume of alumoxane solution will be equal to or less than 1.65 cm$^3$/gram of carrier material. As a result of this proviso, the impregnated carrier material will appear dry immediately following impregnation although the pores of the carrier will be filled with inter alia solvent.

Solvent may be removed from the alumoxane impregnated pores of the carrier material by heating and/or under a positive pressure induced by an inert gas, such as nitrogen. If employed, the conditions in this step are controlled to reduce, if not to eliminate, agglomeration of impregnated carrier particles and/or crosslinking of the alumoxane. In this step, solvent can be removed by evaporation effected at relatively low elevated temperatures of about 40° C., and below about 50° C. to obviate agglomeration of catalyst particles and crosslinking of the alumoxane. Although solvent can be removed by evaporation at relatively higher temperatures than that defined by the range above 40° C. and below about 50° C., very short heating time schedules must be employed to obviate agglomeration of catalyst particles and crosslinking of the alumoxane.

In specific embodiments below, the metallocene is added to the solution of the alumoxane prior to impregnating the carrier with the solution. Again, as noted above, the maximum volume of the alumoxane solution also including the metallocene is the total pore volume of the carrier material sample. The molar ratio of alumoxane provided by aluminum, expressed as Al, to metallocene metal expressed as M (i.e. Zr), ranges from 50 to 500, preferably 75 to 300, and most preferably 100 to 200. An added advantage of the present invention is that this Al:Zr ratio can be directly controlled. In embodiments below the alumoxane and metallocene compound are mixed together at a temperature of about 20° C. to 80° C., for 0.1 to 6.0 hours, prior to use in the infusion step. The solvent for the metallocene and alumoxane can be appropriate solvents, such as aromatic hydrocarbons, halogenated aromatic hydrocarbons, ethers, cyclic ethers or esters, preferably it is toluene.

A variation on the method of incorporation of either alumoxane alone or alumoxane activated metallocene is to employ a volume of solution of alumoxane alone (or alumoxane activated metallocene) small enough to avoid slurry formation together with a liquid medium which is immiscible in that solution; in this variation, the total of the two volumes is sufficient to form a slurry.

The catalyst precursor component formed from the organomagnesium compound, the non-metallocene transition metal and the activated metallocene, must now be activated with a cocatalyst, which is an alkyl aluminum compound, free of water and free of oxygen-containing oligomers.

The cocatalyst can be a trialkylaluminum compound, free of an alumoxane. Preferably, trimethylaluminum (TMA) is the cocatalyst or activator. The amount of the TMA activator is sufficient to give an Al:Ti molar ratio of about 10:1 to about 1000:1, preferably about 15:1 to about 300:1, and most preferably about 20:1 to about 100:1.

The catalyst precursor of this invention comprises a metallocene compound and an alumoxane which is fed to the fluidized-bed reactor for gas phase polymerizations and copolymerizations of ethylene in particulate form. Moreover, in accordance with the invention, the cocatalyst or activator is fed to the fluidized-bed reactor for polymerizations and copolymerizations of ethylene in the absence of alumoxane solution.

Products

Polymerization products comprise at least two components of different molecular weight, with one MW component being of relatively higher molecular weight than the other. The relatively higher molecular weight component, of the bimodal or broad MWD product has a relatively narrow MWD. The metallocene component produces the LMW component of the polyethylene product; however, catalysts prepared with the ethylenebis[1-indenyl]zirconium dichloride compound produce much higher molecular weight polymer components compared to those produced with similar catalysts prepared with the bis [alkylcyclopentadienyl]zirconium dichloride compound. The increase in molecular weight of the LMW polymer component reduces extractables, as extractables are the lowest molecular weight molecules produced in the polymerization reaction.

The resin MFR value is defined by the ratio of HLMI/MI measured according to ASTM D-1238, conditions E and F. When the product is polyethylene or copolymers of ethylene containing at least 90% by weight ethylene units, the product can be high density of greater than 0.93 g/cc to 0.96 g/cc with MFR values of 30 to 80. Alternatively, the product of polymerization can be LLDPE with a density of less than 0.94 g/cc, and MI of 0.1 to 5.0 and MFR values defined as HLMI/MI, measured by ASTM D-1238 Conditions E and F of 30 to 80. Each of the products will contain at least two different molecular weight fractions.

Moreover, the products exhibit excellent toughness, e.g. Dart Drop Impact (DDI) as measured by ASTM D-1709.

Polypropylene, ethylene polymers (homopolymers), as well as copolymers of ethylene with one or more $C_3$–$C_{10}$ alpha-olefins, can be produced in accordance with the invention. Thus, copolymers having two monomeric units are possible, as well as terpolymers having three monomeric units. When LLDPE is produced, the alpha olefin contains 4 to 10 carbon atoms. LLDPE exhibits a density of less than 0.94 g/cc. Particular examples of such polymers include ethylene/1-butene copolymers, ethylene/1-hexene copolymers and ethylene/4-methyl-1-pentene copolymers. One object of the invention is to produce LLDPE films.

Ethylene/1-butene, ethylene/1-hexene, and ethylene/1-octene copolymers are the most preferred copolymers polymerized in the process of and with the catalyst of this invention. The ethylene copolymers produced in accordance with the present invention preferably contain at least about 70% by weight of ethylene units. The cocatalyst of this invention can also be used with the catalyst precursor of this invention to polymerize propylene and other alpha-olefins and to copolymerize them.

Hydrogen may be used as a chain transfer agent in the polymerization reaction of the present invention. The ratio of hydrogen/ethylene employed will vary between about 0.001 to about 0.5 moles of hydrogen per mole of ethylene in the gas phase. Any gas inert to the catalyst and reactants can also be present in the gas stream.

For the production of ethylene copolymers in the process of the present invention, an operating temperature of about 30° C. to 115° C. is preferred, and a temperature of about 75° C. to 95° C. is most preferred. Temperatures of about 75° C. to 90° C. are used to prepare products having a density of about 0.91 to 0.92 g/cc and temperatures of about 80° C to 100° C are used to prepare products having a density of about 0.92 to 0.94 g/cc, and temperatures of about 90° C. to 115° C. are used to prepare products having a density of about 0.94 to 0.96 g/cc.

A fluidized-bed reactor for gas phase polymerization is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas. The partially or completely activated catalyst is injected into the bed at a point above the distribution plate at a rate equal to its consumption. The production rate of polymer in the bed is controlled by the rate of catalyst injection. Since any change in the rate of catalyst injection changes the rate of generation of the heat of reaction, the temperature of the recycle gas is adjusted to accommodate the change in rate of heat generation. Complete instrumentation of both the fluidized-bed and the recycle gas cooling system is, of course, necessary to detect any temperature change in the bed so as to enable the operator to make a suitable adjustment in the temperature of the recycle gas. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

EXAMPLES (I) CATALYST PREPARATION

TITANIUM CATALYST PREPARATION:

541 gram of silica (Davison Grade calcined at 600° C.) was weighed into a two-gallon stainless steel autoclave containing a stirring paddle. Next, ca. 4.8 liter of dry isopentane was added to the autoclave and the stirring rate was set at 100 rpm. The temperature of the silica/isopentane slurry was 54° C. to 58° C. Next, 546 ml of dibutylmagnesium (0.713 mmol/ml) was added to the slurry. The contents of the autoclave were stirred for 60 minutes. Then, 42.7 ml of neat 1-butanol (466.6 mmol) was added to the autoclave and stirring was continued for one hour. Finally, 25.7 ml of titanium tetrachloride (234.4 mmol) was added to the autoclave and stirring continued for 60 minutes. After this time, the liquid phase was removed by evaporation under a nitrogen purge. Ti found 1.59 wt. %; Mg found 1.39 wt. %.

Catalyst 1

SOLUTION (A): 0.059 gram of ethylenebis[1-indenyl] zirconium dichloride (φ.141 mmol) was transferred to a 30 ml serum-bottle and 3.0 ml of a 4.75 Molar (14.1 wt. % Al) solution of methylalumoxane was added. The bottle was shaken for about one minute to form a dark red solution which was used immediately as described below.

Under an inert atmosphere, 1.73 gram of the titanium-containing catalyst described above was added to a 100 ml pear-flask containing a magnetic stirring bar which was used to agitate the catalyst powder vigorously. Then at room temperature, 2.5 ml of Solution (A) described above, was added dropwise to the flask over a 4 minute period. The total volume of Solution A used was such that the titanium containing catalyst always appeared dry during the entire addition time. However, during this addition time, the white titanium-containing catalyst turned a light brown color. Finally, the pear flask was placed into an oil bath set at 50° C., and the residual toluene from Solution A was removed under a nitrogen purge to give a dry, tan, free-flowing powder. Al=12.7 wt. %; Mg=0.95 wt. %; Ti=1.16 wt. % and Zr=0.40 wt. %.

Catalyst 2

SOLUTION (B): 2.616 gram of ethylenebis[1-indenyl] zirconium dichloride (6.251 mmol) was transferred to a one-liter bottle and 263 ml of a 4.75 Molar (14.1 wt. % Al) solution of methylalumoxane was added. The bottle was shaken for about one minute to form a dark red solution which was transferred into a 1.5 liter stainless steel hoke bomb and used immediately as described below.

Under an inert atmosphere, 311 gram of the titanium-containing catalyst described above was added to a 2 gallon, glass-reactor vessel containing a helical stirrer to agitate the catalyst powder and a temperature jacket which was set at about 26° C. The stirrer was set at 107 rpm. Then, the contents of the hoke bomb (Solution B) was added to the titanium-containing catalyst in approximately 5–10 ml aliquots every 30 seconds over a 15 minute period. The total volume of Solution B used was such that the titanium-containing catalyst always appeared dry during the entire addition time. However, during this addition time, the white titanium-containing catalyst turned a light tan color. After the addition of Solution B was complete, the jacket temperature was set at 45° C. and the residual toluene was removed under a nitrogen purge for about 5 hours.

Catalyst 3

SOLUTION (C): 0.079 gram of ethylenebis[1-indenyl] zirconium dichloride (0.189 mmol) was transferred to a 30 ml serum-bottle and 8.0 ml of a 4.75 Molar (14.1 wt. % Al) solution of methylalumoxane was added. The bottle was shaken for about one minute to form a dark red solution which was used immediately as described below.

Under an inert atmosphere, 2.03 gram of the titanium-containing catalyst described above was added to a 200 ml pear-flask containing a magnetic stirring bar which was used to agitate the catalyst powder vigorously. Then at room temperature, 3.0 ml of Solution C described above, was added DROPWISE to the flask over a 7 minute period. The total volume of Solution C used was such that the titanium-containing catalyst always appeared dry during the entire addition time. However, during this addition time, the white titanium-containing catalyst turned a light brown color. Finally, the pear-flask was placed into an oil bath set at 50° C., and the residual toluene from Solution C was removed under a nitrogen purge to give a dry, tan, free-flowing powder. Al=13.0 wt. %; Mg=0.94 wt. %; Ti=1.11 wt. % and Zr=0.23 wt. %.

Catalyst 4

SOLUTION (D): 6.56 gram of bis[n-butylcyclopentadienyl]zirconium dichloride (16.22 mmol) was transferred to a one-liter bottle and 342 ml of a 4.75 Molar (14.1 wt. % Al) solution of methylalumoxane was added. The bottle was shaken for about one minute to form a brown solution which was transferred into a 1.5 liter stainless steel hoke bomb and used immediately as described below.

Under an inert atmosphere, 232 gram of the titanium-containing catalyst described above was added to a 2 gallon, glass-reactor vessel containing a helical stirrer to agitate the catalyst powder and a temperature jacket which was set at about 26° C. The stirrer was set at about 200 rpm. Then, the contents of the hoke bomb (Solution D) was added to the titanium-containing catalyst in approximately 5–10 ml aliquots in approximately one minute intervals. The total volume of Solution D used was such that the titanium-containing catalyst always appeared dry during the entire addition time. However, during this addition time, the white titanium-containing catalyst turned a dark brown color. After the addition of Solution (D) was complete, the jacket temperature was set at 45° C. and the residual toluene was removed under a nitrogen purge for about 5 hrs to provide a free-flowing powder. Al=11.3 wt. %; Mg=0.96 wt. %; Ti=1.16 wt. % and Zr=0.37 wt. %.

TABLE I

SUMMARY OF CATALYSTS

| CATALYST | Al/Zr molar ratio | Al Loading (mmol Al/g Ti component) |
|---|---|---|
| 1 | 100 | 7.0 |
| 2 | 200 | 4.0 |
| 3 | 200 | 7.0 |
| 4 | 100 | 7.0 |

(II) POLYMERIZATION

Ethylene/1-hexene copolymer was prepared with each of the catalysts numbered 1-4 to produce polyethylene. The same polymerization conditions were used for each catalyst as described below:

A 1.6 liter stainless steel autoclave, at about 49° C., was filled with 0.750 liter of dry heptane, 0.030 liter of dry 1-hexene and 4.0 mmol of TMA while the autoclave was under a slow nitrogen purge. The reactor was closed, the stirring rate was set at about 900 rpm, the internal temperature was increased to 85° C., and the internal pressure was raised from 10 psi to 16 psi with hydrogen. Ethylene was introduced to maintain the reactor pressure at about 202 psig. Next, 0.0291 gram of catalyst 1 was introduced into the reactor with ethylene over-pressure and the temperature was increased and held at 95° C. The polymerization was continued for 60 minutes, and then the ethylene supply was stopped and the reactor allowed to cool to room temperature. 129.6 gram of polyethylene was collected. The HEMI of the polymer was 42.7 and the GPC chromatogram of the polymer is shown in FIG. 1.

Each of the four catalysts was evaluated as described above and the results are summarized below:

TABLE II

| Catalyst Number | Activity g PE/g cat. | HLMI | MFR | $X_{hmw}$* | Zr Activity kg PE/g Zr |
|---|---|---|---|---|---|
| 1 | 4450 | 42.7 | 73.6 | 0.18 | 910 |
| 2 | 3550 | 17.1 | 56.6 | 0.19 | 1940 |
| 3 | 4650 | 123.0 | 33.8 | 0.12 | 1780 |
| 4 | 2650 | 3.8 | 49.0 | 0.71 | 360 |

*$X_{hmw}$ is weight fraction of the HMW polymer component (III) DISCUSSION

Catalyst 1, which was prepared using ethylenebis[1-indenyl]zirconium dichloride, exhibits significantly higher zirconium-based activity and provides a LMW polymer fraction with a significantly higher molecular weight than catalyst 4 which was prepared with bis(n-butylcyclopentadienyl)zirconium dichloride (see TABLE II). Catalysts 1 and 4 have the same formulation with an Al/Zr molar ratio of 100 and an Al loading of 7.0 mmol Al/g of titanium catalyst component.

What is claimed is:

1. A catalyst which produces bimodal molecular weight distribution ethylene (co)polymer under ethylene polymerization conditions, the catalyst comprising:

a supported catalyst comprising at least two different transition metal compounds, wherein a first of said two different transition metal compounds contains an ethylene-bridged bis[1-indenyl] group bonded to a transition metal compound;

wherein a second transition metal compound of said two different transition metal compounds is a non-metallocene transition metal compound of Group 4A or 5A metals and exhibits a hydrogen response which is different from the hydrogen response exhibited by the first transition metal compound; and wherein the ethylenebis[1-indenyl] transition metal compound produces the lowest molecular weight polymer component of the ethylene (co)polymer.

2. The catalyst of claim 1 wherein the ethylene-bridged bis[1-indenyl] based compound is a zirconium compound.

3. The catalyst of claim 1 wherein the atomic ratio of transition metal provided by the ethylene-bridged bis[1-indenyl] transition metal to the second transition metal compound ranges from 0.01 to 0.50.

4. The catalyst of claim 1 wherein the second transition metal compound is titanium tetrachloride.

5. The catalyst of claim 1 which comprises silica with a hydroxyl group content of 0.3 to 2.5 mmole per gram silica.

6. The catalyst of claim 5 wherein the combined content of each of the transition metals from said two compounds range from 0.5 wt. % to 5.0 wt. % of the catalyst composition including said silica.

7. The catalyst of claim 1, in combination with trialkylaluminum.

8. The catalyst of claim 7, wherein the first of said two transition metal compounds is activated with an alumoxane.

9. The catalyst of claim 8, wherein the first of said two transition metal compounds is a zirconium compound.

* * * * *